235-380 SR

1/13/87 XR 4,636,951

United States Patent [19]

Harlick

[11] Patent Number: 4,636,951

[45] Date of Patent: Jan. 13, 1987

[54] POKER MACHINE COMMUNICATION SYSTEM

[75] Inventor: Neville G. Harlick, Sydney, Australia

[73] Assignee: Ainsworth Nominees Pty. Ltd., Rosebery, Australia

[21] Appl. No.: 605,409

[22] Filed: Apr. 30, 1984

[30] Foreign Application Priority Data

May 2, 1983 [AU] Australia ............................. PF9129

[51] Int. Cl.[4] ..................... G06F 15/28; A63B 71/00; A63B 67/00; A63F 1/00

[52] U.S. Cl. ............................... 364/412; 273/138 A; 273/1 E; 273/DIG. 28; 235/380

[58] Field of Search ............... 364/401, 406, 408, 410, 364/412, 200, 900; 235/379, 380; 273/138 A, 138 R, 85 CP, 1 E, DIG. 28

[56] References Cited

U.S. PATENT DOCUMENTS

| | | | |
|---|---|---|---|
| 3,810,627 | 5/1974 | Levy | 273/138 A |
| 3,909,002 | 9/1975 | Levy | 273/138 A X |
| 4,072,930 | 2/1978 | Lucero | 364/412 |
| 4,283,709 | 8/1981 | Lucero et al. | 364/200 X |
| 4,322,612 | 3/1982 | Lange | 273/138 A |
| 4,335,809 | 6/1982 | Wain | 364/900 X |
| 4,339,798 | 7/1982 | Hedges et al. | 364/412 |
| 4,375,032 | 2/1983 | Uchida | 235/380 |
| 4,467,424 | 8/1984 | Hedges et al. | 364/412 |
| 4,494,197 | 1/1985 | Troy et al. | 364/412 |
| 4,531,487 | 7/1985 | Uhland | 364/412 |
| 4,547,851 | 10/1985 | Kurland | 364/401 |
| 4,593,904 | 6/1986 | Graves | 273/1 E |

FOREIGN PATENT DOCUMENTS

WO80/0025-12 11/1980 PCT Int'l Appl. .

OTHER PUBLICATIONS

"The Story of No-Wait Banking", *Centerre Bank Brochure,* 1984.

*Primary Examiner*—Jerry Smith
*Assistant Examiner*—Jon D. Grossman
*Attorney, Agent, or Firm*—Holman & Stern

[57] ABSTRACT

A system for controlling the operation of electronically linked gaming machines which enables information to be transferred between machines and from each machine to a control unit. In particular, credits on a machine can be transferred to another machine and the credit state of each machine can be interrogated and adjusted from the central control unit.

3 Claims, 7 Drawing Figures

POKER MACHINE COMMUNICATION SYSTEM

BACKGROUND OF THE INVENTION

The present invention relates to poker machines (otherwise known as slot machines or fruit machines) in general, and in particular to a communication system for a poker machine installation which allows remote crediting and debiting of a player's balance in an individual poker machine from a central control unit.

It is commonly known to produce poker machines in which the player may establish a credit by inserting one or more coins or tokens, thereby enabling the machine to be operated until the credit has been exhausted. In such machines, payment of prizes is normally achieved by increasing the credit in the machine by an appropriate amount, and the player is able to redeem his credit at any time, either directly from the machine or by receiving prizes to the value of his credit.

It is also known to connect poker machines in an installation to a central computer system which can interrogate each machine in the system to gather audit data collected by the machines during their normal course of operation. This audit data includes data relating to the number of coins or tokens inserted into the machine, the number of times the machine has been played, the amount paid in prizes, the number and the type of jackpots paid by the machine, and the number of door openings, etc. since the last interrogation of the machine.

It is also common in some countries to operate poker machine systems wherein the player does not insert coins or tokens into the machine being played, but instead pays at a central location. The cashier on receiving the appropriate payment then credits the machine remotely by transmitting electrical pulses to the machine. Payment of prizes are made by an operator who reads a credit meter on the machine when the player wishes to stop playing. The credit is then paid either as a cash amount, or as a prize of equivalent value to the credit meter reading.

SUMMARY OF THE INVENTION

The present invention consists in a system of gaming machines, comprising a communication system linking a plurality of gaming machines to a central control unit, each of said machines including credit recording means and means to enable operation of that machine, said means to enable operation being activated in response to a credit in the credit recording means, and the central control unit and each of the plurality of machines including transmitter and receiver means which are interconnected to form said communications system, wherein each credit recording means is interrogable and adjustable in response to commands from the central control unit, the commands being transmitted via the communication system, thereby enabling the credit in the credit recording means of any of said machines in the system to be established, cancelled, adjusted or moved to another machine in the system.

The communication means would preferably be in the form of a digital communication link wherein data is transmitted via interconnecting wires, however, transmission can also be via optical fibres, electro-magnetic transmissions, or any other suitable transmission medium.

The present invention in addition to being applicable to poker machines, is also applicable to video game machines and installations thereof.

An embodiment of the invention will now be described, by way of example, with reference to the accompanying drawings in which:

DETAILED DESCRIPTION OF THE DRAWINGS

Figure 2:
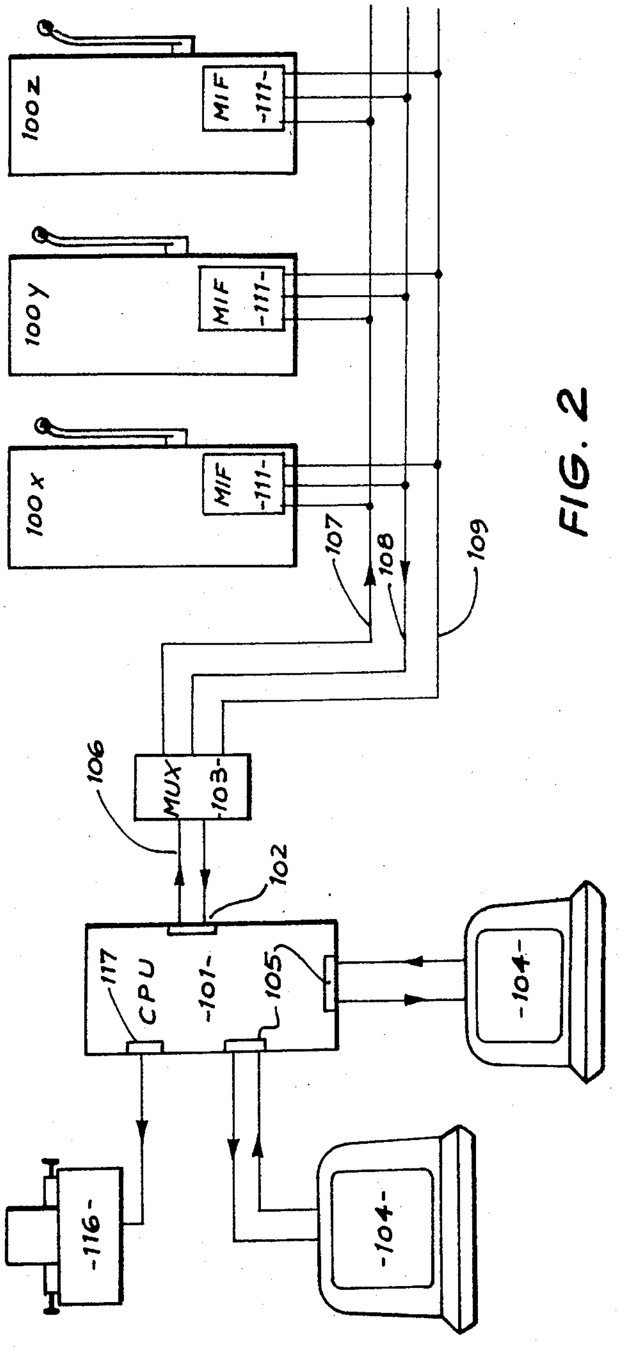
FIG. 2 is a block diagram of one chain at the system in FIG. 1, showing more detail.
Figure 3:
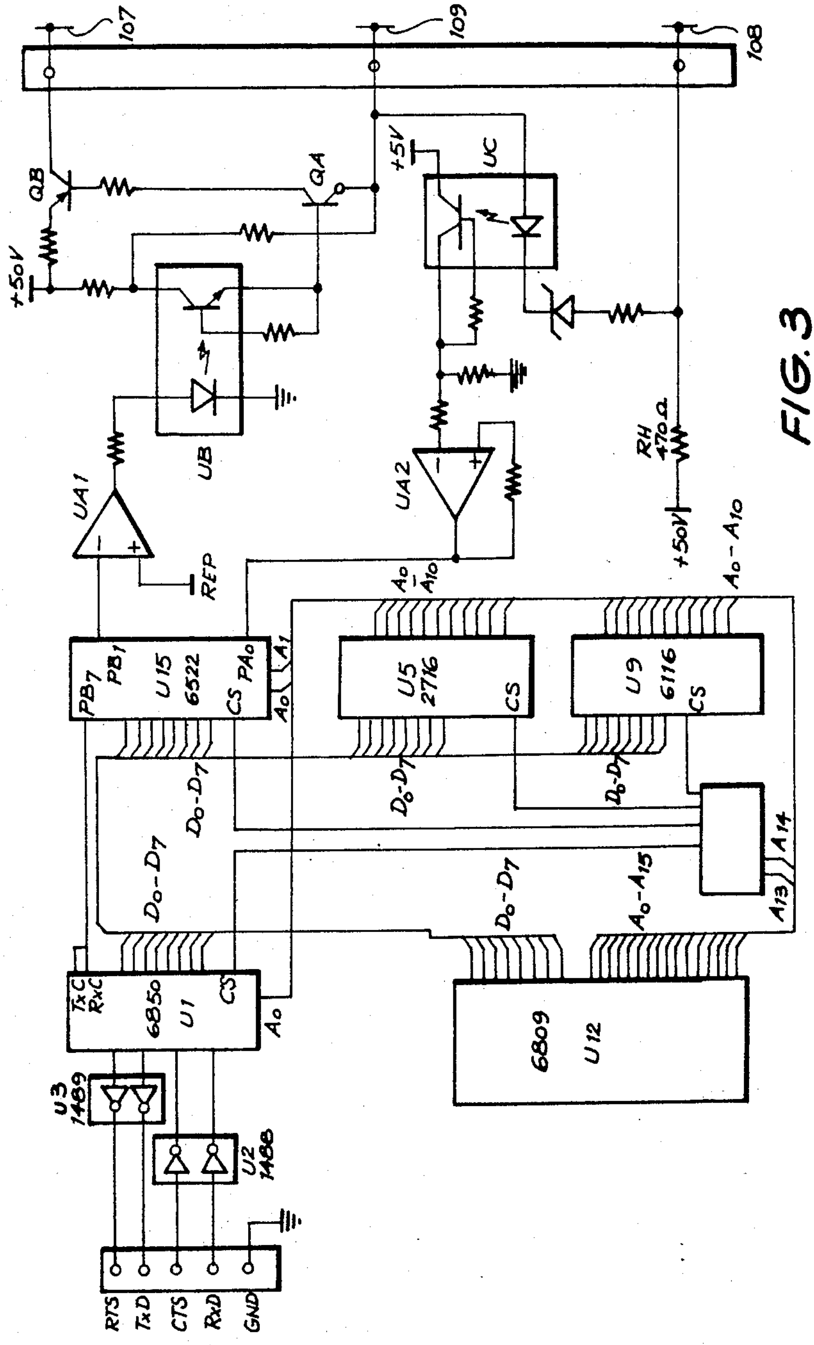
Figure 4:
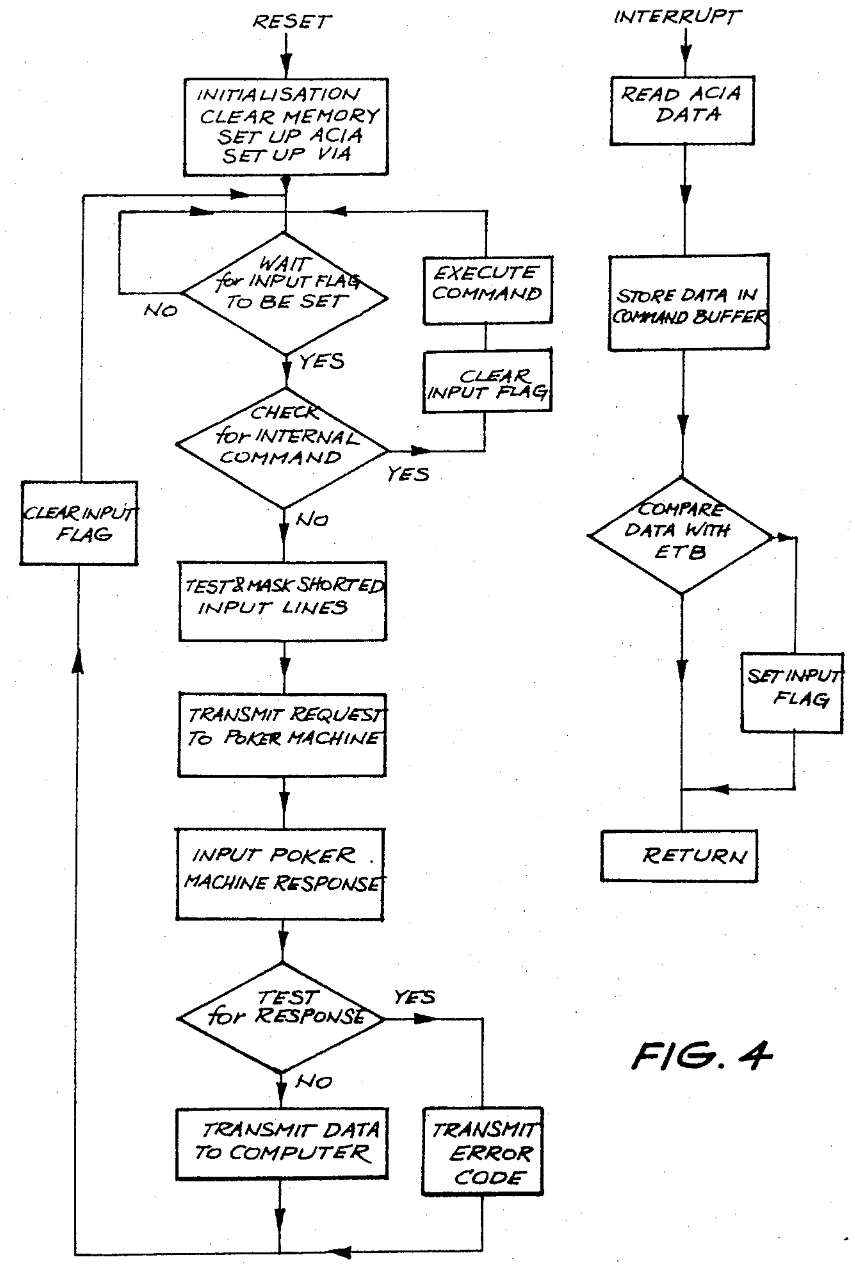
Figure 5:
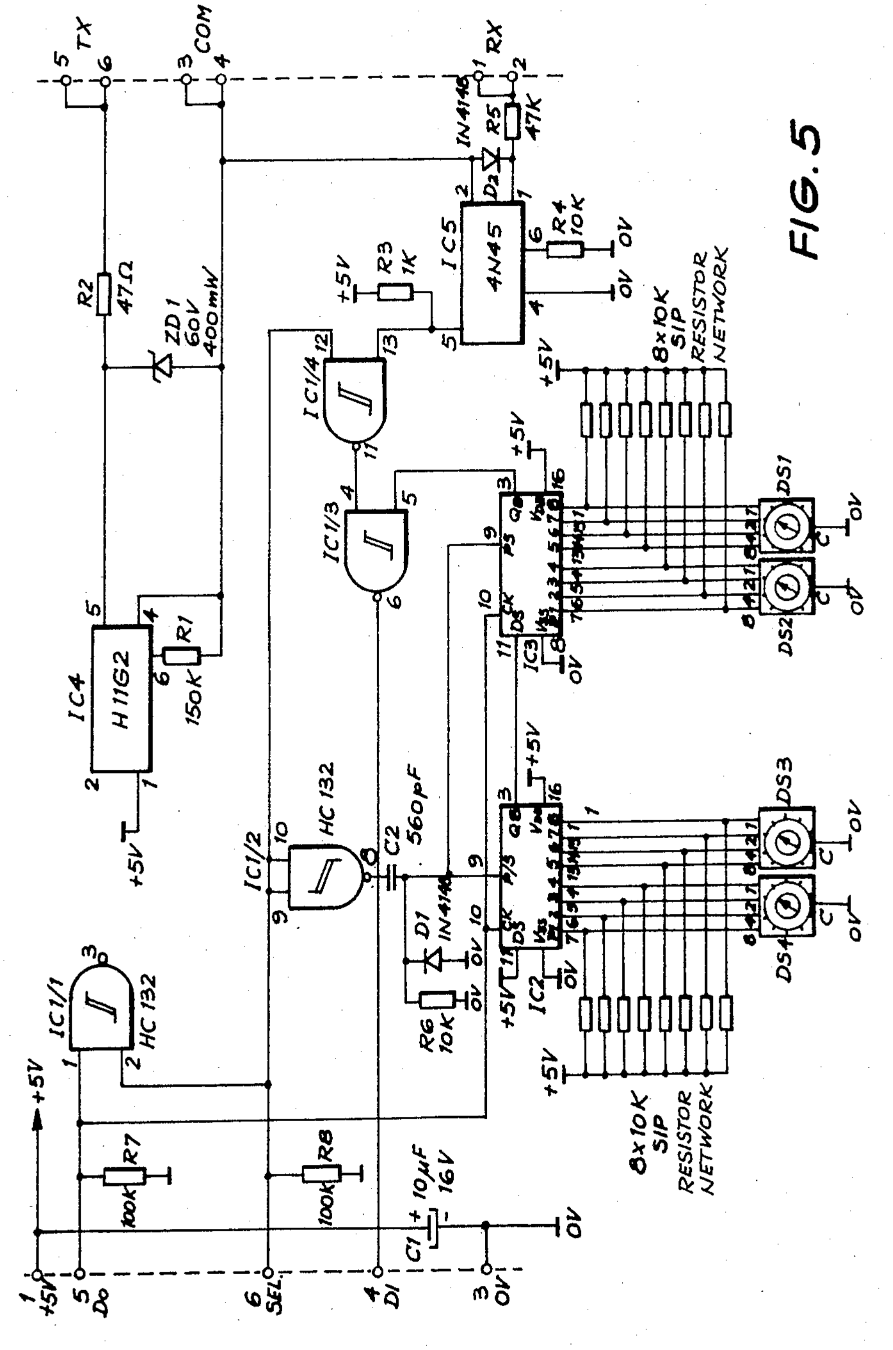
Figure 6:
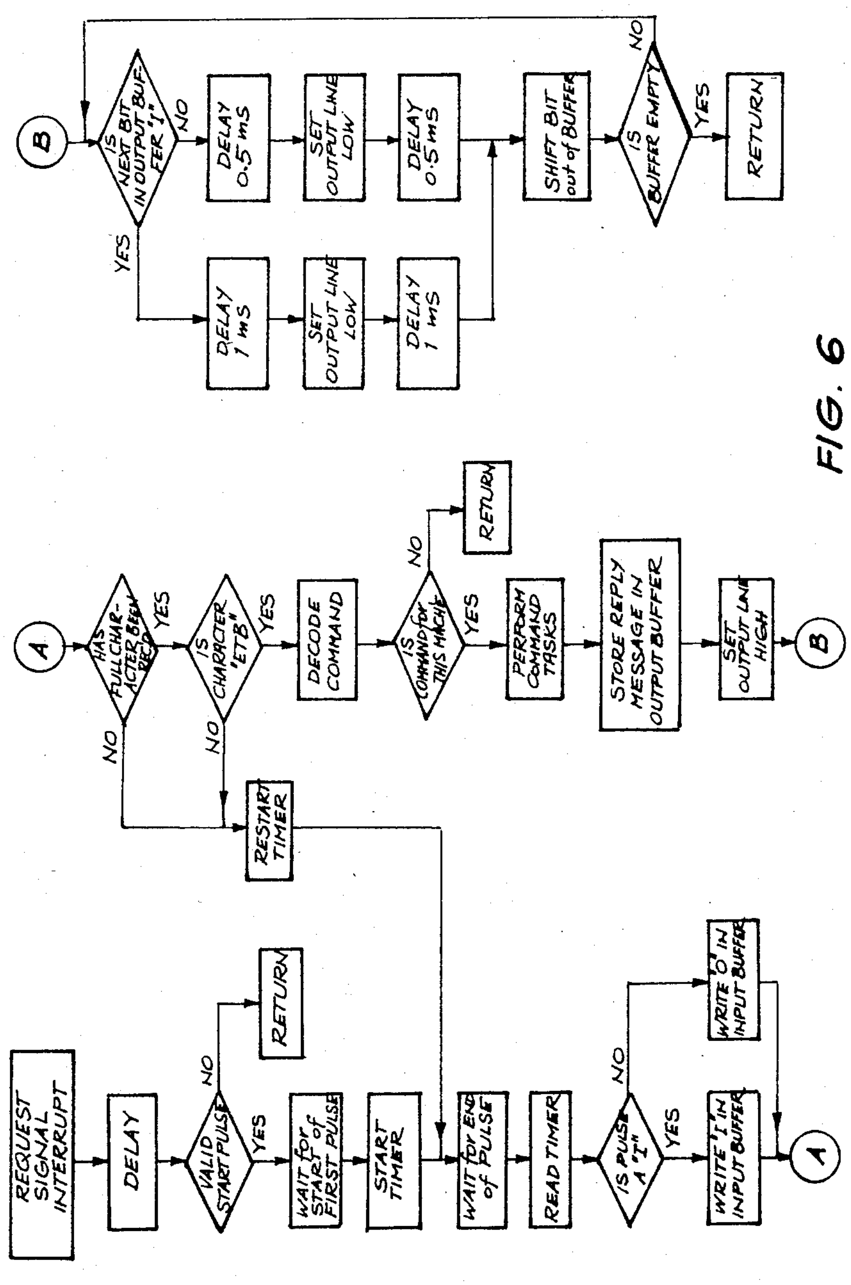
Figure 7:
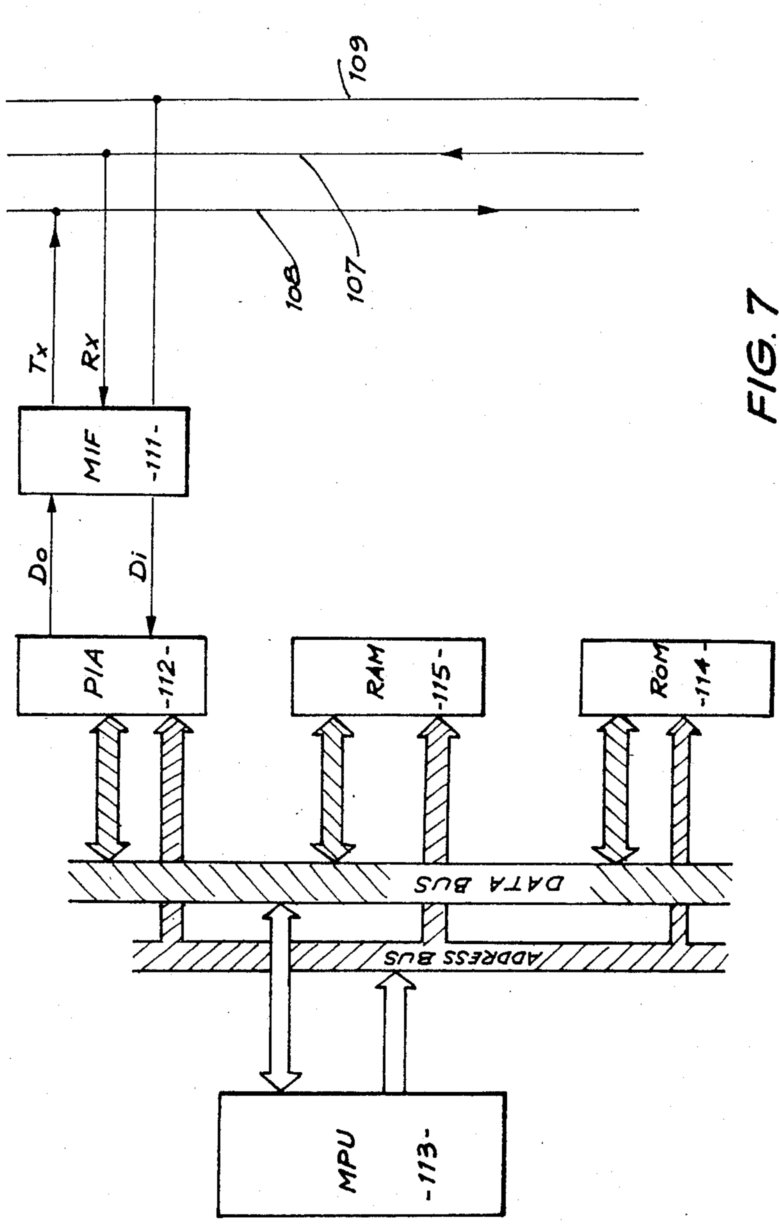

FIG. 3 schematically illustrates the circuit of the multiplexing unit of FIG. 2;

FIG. 4 is a flow chart of the multiplexing unit of FIG. 3;

FIG. 5 schematically illustrates the circuit of the poker machine interface unit of FIG. 2;

FIG. 6 is a flow chart for that part of the poker machine operating program which services the communications interface; and FIG. 7 is a partial block diagram of a poker machine micro processor control system, illustrating the interconnection of the interface unit FIG. 5 to the machine.

DETAILED DESCRIPTION OF THE INVENTION

Figure 1:
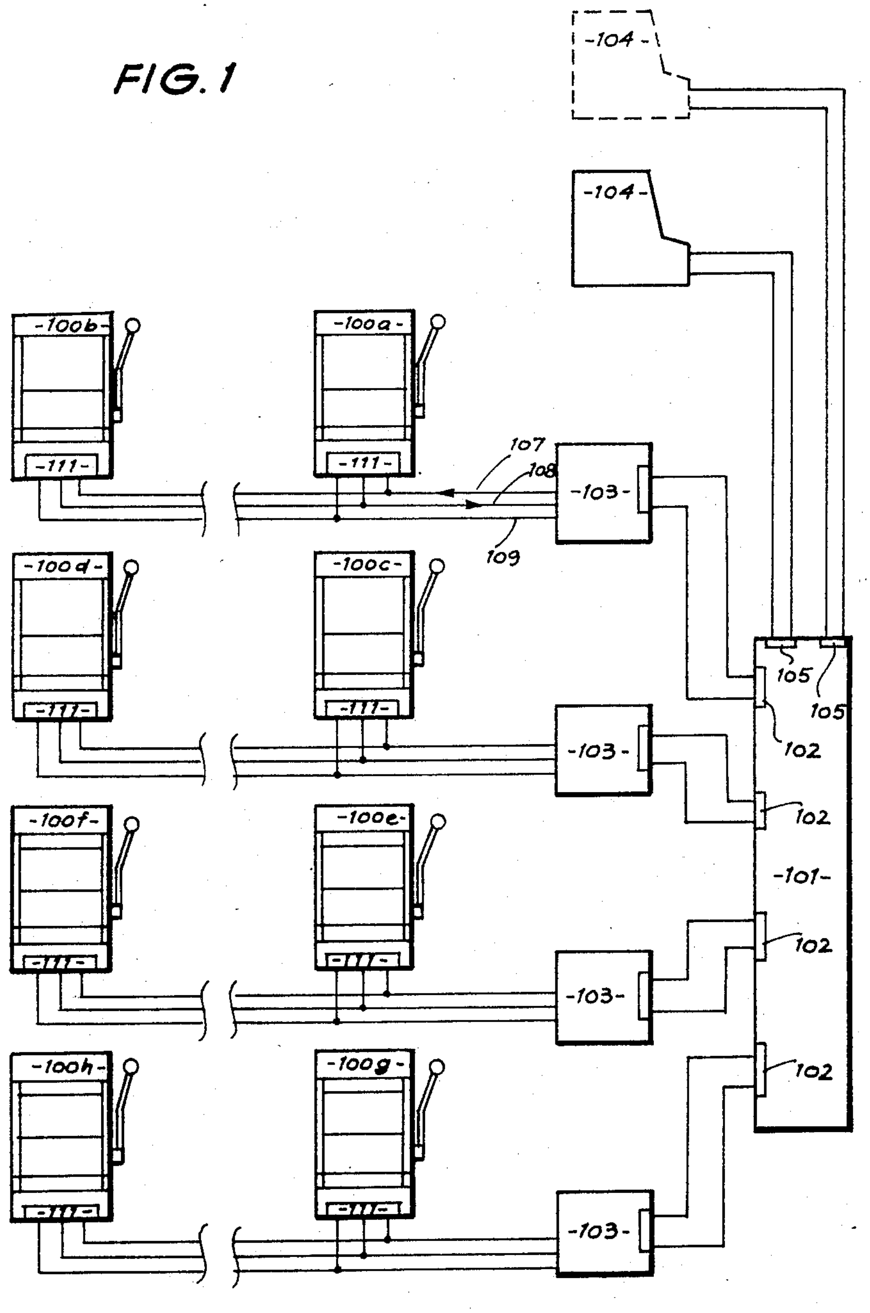
FIG. 1 is a block diagram of a poker machine communication system according to the present invention.

As illustrated in FIG. 1, a system according to the present invention comprises a plurality of poker machines 100*a*–100*h* connected together and to a central controller CPU 101 via a communications network. In the illustrated system, a number of CPU communications ports 102 are provided each one of which is connected to a Multiplexing Unit 103, which in turn has connected to it a number of machines 100*a*–*h* which are "daisy chained" together. This interconnection system is not in itself novel and other suitable systems of interconnection could serve equally well. A number of Video Display Units 104 are also connected to the control CPU 101, via additional communications ports 105, to enable control and interrogation of the system by one or more operators. Reports of system and machine status may also be obtained on a printer 116 (see FIG. 2) connected to the central computer 101 via a port 117.

Each of the poker machines 100 in the system is of the type which incorporates a microprocessor to control the operation of the machine. This microprocessor collects and holds the audit data as part of it's normal function. However, in the present system the microprocessor is programmed to transmit the audit data to the controller CPU 101 via the communication system, in response to an interrogation signal from the controller CPU.

Another function which the microprocessor in the poker machine normally performs, is the maintaining of a record of the player's current credit balance. In systems according to the present invention, this function is also adapted to be remotely monitored and controlled by the central controller CPU via the communication system.

The system of the present invention will not only allow the system operator to increase or decrease the player's credit in a particular machine, such as when the player 'buys' more credit or requests his credit to be paid out, but also allows the player's credit to be transferred from one machine to another. These features of the system may be provided at a relatively low cost where the system already incorporates a communication system for the collection of audit data.

While the system of the present invention can be used to provide a coinless poker machine installation, wherein the machines are not provided with means for inserting coins, it is not intended that the invention be limited to this type of installation, as systems wherein the player has the choice of inserting coins into a machine, or alternatively having the machine remotely credited are also possible.

Another known method of gathering audit data involves an operator moving from machine to machine with a portable module which is placed against a Light Emitting Diode (LED) display on the machine. A switch on the machine is then operated, causing the machine to modulate the light output of the LED with a digital signal representing the audit data. The portable module, which incorporates a cassette tape recorder, receives the audit data and then records it onto a standard audio cassette tape which may be later replayed to load the data collected from each of the machines into a central computer. This method of data collection may be incorporated into machines in an installation according to the present invention, as a back-up data collection system, which would be used when the communication system of the present invention is being serviced or is out of operation due to malfunction.

The preferred embodiment of the present invention operates under the control of a program running on a PDP-11 computer 101 under the RSX-11 operating system to facilitate the on-line communication of poker machines 100 connected thereto. The program also allows for both on-line data collection and remote credit facilities.

The actual network that supports the on line communication facilities of the preferred embodiment of the system enables the connection of up to 1000 machines in a "Daisy Chain" serial network to the central computer.

The block diagram, illustrated in FIG. 2, shows the basic configuration of one chain of the network according to the preferred embodiment. The purpose of the network is to enable communication between a plurality of poker machines and a computer via an RS232 serial communication line 106 operating at 300,600,1200 or 2400 baud, which is in turn interfaced to a multiplexed communications channel. The multiplexed channel is a three wire implementation (Request (107), Reply (108) and common (109)) in a master slave environment whereby the central computer initiates all responses. That is, the poker machines "speak only when they are spoken to". This type of polled network will avoid any data collision between devices.

The information from the central computer system to the multiplexing (MUX) unit is in standard RS232 format. This is then converted into a format which has been developed for the present systems and which will be referred to hereinafter as SYCOM format. The SYCOM format uses 50 volt signal lines to allow high noise immunity with parity checking for error detection. As with RS232 it is an asynchronous line but uses a modified frequency shift keying to encode the information. Once the MUX transmits the message on the request line 107 to the poker machines 100 it then waits for a response on the reply line 108. If the particular machine 100 required for access is busy at this time the MUX unit will generate the appropriate message back to the central computer system 101. Otherwise it will decode the response and reformat it back to RS232 ready for transmission to the computer. Also, if data is corrupted, the MUX will alert the central computer system 100.

Referring to FIG. 3, the Terminal Multiplexing Unit (MUX) consists of three main sections, a digital control circuit, a set of 50 volt line driver and line receiver circuits, an RS232 interface and a power supply.

The digital control circuit contains a micro processor U12 and its support devices. These include a serial interface adaptor (ACIA-6850) U1 to facilitate the RS232 computer interface and a parallel interface adaptor (VIA-6522) U15 for the poker machine communications.

The 50 volt line driver and receiver circuits comprise eight identical circuits (only one shown for simplicity) which connect the 5 V signals of the digital section to the 50 V lines used to communicate with the poker machines. 50 Volt lines are used to improve noise immunity and are coupled by opto-couplers, to isolate them electrically both from the poker machines and the control computer.

The poker machines 100 are arranged in groups, each group connected to one of the line driver circuits, with a maximum of eight groups per multiplexer.

If a fault occurs on one of the lines, only the group in which the fault occurs will be affected, the other groups being able to communicate normally.

The RS232 interface uses a standard bus oriented interface device, together with standard line driver and receiver devices.

The power supplies (not shown) provide regulated +5 V for the digital section, +12 V and −12 V for the RS232 drivers and an isolated 50 V DC for the communication lines.

When inactive, the processor U12, under control of it's stored program, monitors the RS233 input line from the control computer 101. When it senses that a complete command has been issued, transmission to the poker machines begins over the request line 107.

Since the slot machines are all daisy-chained together, they all receive the message but only the selected machine will respond.

The processor waits for the complete response, then relays the information back to the computer over the RS232 communications channel.

The clock for the ACIA U1 is derived from the 1 MHz system clock using one of the timers in the VIA U15 to perform division.

Once initialized, the timer causes port line PB7 to oscillate without further processor intervention, this signal being used as the transmit clock TxC and the Receive Clock RxC of the ACIA.

A "watch dog" circuit is also provided (not shown), which will reset the processor whenever an output line of the VIA stops toggling, this line being toggled by the software, in order that, if the processor stops operating, it will be automatically reset after a brief period.

Port line PB1 is fed to OP-AMP comparitors UA1 which drive the photo diode in each of the OPTO couplers UB. The opto-coupler UB switches on transistor QA which in turn switches on transistor QB, opening the path between the 50 volt supply and the request line.

The response line is held high by a 470 Ohm pull-up resistor RH connected to the 50 V supply. When a reply comes from the slot machine, the line 108 is pulled low by a photo transistor on the machine interface board (MIF), causing the phototransistor in UC (4N38) to cut off and lowering the voltage at pin 5 of the comparator UAS (LM324). The output of UA2 is connected to input PA of the VIA U15 which can be read by the processor U12.

The operation of the MUX is controlled by a program stored in the ROM U5, while the various data buffers, required to temporarily store data passing through the MUX, are located in the RAM U9.

Referring to FIG. 4, the operation of the MUX is controlled by two programs, one of which provides the operating procedure for the MUX, and the other of which is an interrupt routine which services the RS232 communication link with the central computer 101.

The main program commences operating upon a reset signal and after initializing the communications devices, it waits for an input flag to be set, indicating that a command has been received from the central computer. When such a command has been received, a test is performed to determine whether the command is directed to the MUX or to one of the poker machines 100, and if it is directed to the MUX, it is acted upon and the input flag cleared, after which the MUX again waits for the input flag to be set.

If the command is for a poker machine 100 connected to the MUX, the command is then retransmitted over the 50 volt request line 107 and the machine response monitored. After testing the machine response for errors, it is then retransmitted to the central computer over the RS232 communications channel 106 and the input flag cleared. The MUX then waits for the input flag to be set again and repeats the whole routine.

In parallel with operating program, a second, interrupt driven routine services the RS232 receiver. This routine reads the ACIA input register in response to an interrupt signal generated by the ACIA U1, the interrupt signal being generated when the ACIA has received a data word from the central computer 101. The RS232 service routine then stores the received data and also tests the data word to determined whether it is the last word of a message transmission. If the data word is the last word of a transmission, the input flag is set, indicating to the operating program that a complete message has now been received. The RS232 service routine then allows control to be returned to the main operating program which will then continue from where it was interrupted.

A "watchdog" routine is also included in the main operating program (not shown in FIG. 4), which toggles a line of the VIA U15, causing the "watchdog" circuit to hold the reset line high. If the Operating Program halts for more than a predetermined time, the "watchdog" circuit will cause the reset line to go low, due to the absence of transitions on the toggled line.

Referring now to FIG. 5, each poker machine has an interface card which translates the SYCOM signals back to TTL signal levels. This card also has the serial number setting which allows each machine to have a unique number in the range 0 to 9999. This card interfaces to the poker machine processor via an I/O port (6821 PIA lines) and provides isolation by means of opto couplers. All outputs are open collector, enabling them to be in parallel to the common "reply" line 108. The input terminal of the machine is connected to the LED of an opto-coupler, all of the machine inputs being connected in parallel to the "request" line 107.

Normally, if a command cannot be executed successfully by the poker machine it will issue a negative acknowledge (NAK).

Serial data from a peripheral interface adaptor (P.A.) in the poker machine appears on the data output line (FIG. 5) Do, and drives IC1/1, which is one section gate of a quad 2 input NAND gate.

ICI is a CMOS Schmidt trigger device and is used to provide sufficient drive capability for the H11G2 OPTO coupler.

Zener diode ZD1 is used to provide protection for the output driver against voltage spikes on the reply line 108 (TX).

The other end of the reply line 108 has a 470 Ohm pull-up resistor to 50 volts which is situated in the MUX unit 103.

To enable data from the poker machine to appear on the response line, SEL must be a logic "1". This condition also enables ICI/4, thus allowing data from the request line RX to appear at the data input line, Di.

The request line also swings between 0 to 50 volts when data is being transmitted and drives IC5 via current limiting resistor R5. The output from IC5 is gated through IC1/4 and IC1/3 which also gates the signal from IC3 onto the Di line.

IC1/2, IC2 and IC3 provide the means of setting the machine serial number. When SEL goes low, the output of ICI/2 goes high and a short pulse provided by C2/R6 is applied to the parallel load pins of shift registers IC2 and IC3. This loads the shift registers with the rotary switch settings. SEL going low disables IC1/4 to prevent request data from entering through and the high level on the output of ICI/4 enables IC1/3 allow the shift register output to be clocked into the Di line.

The shift registers are clocked by toggling the Di line. The machine processor does this 16 times to read the switch settings. Note that the shift input to IC2 is tied high so that the 16th data bit clocked through the registers will always be a logical "1", thus ensuring that pin 5 of IC3 is left in the high state at the end of a serial number read cycle. This means that IC1/3 is enabled so that request data can be read.

The block diagram of FIG. 7 illustrates the method by which the machine interface of FIG. 5 is interconnected with a poker machine in order to allow communication with a poker machine system. The machine interface unit 111 is connected to a perpipheral interface adaptor (PIA) 122, which is in turn connected to the microprocessor control unit 113 of the poker machine 100. An interrupt routine which is used to service the machine interface unit 111 resides in a ROM 114 while statistical data gathered by the machine is stored in a RAM 115. The input and output buffers required by the interface service routine are also implemented in the poker machine's RAM 115.

Referring now to FIG. 6, the interrupt routine provided in the program of each poker machine, which enables the servicing of the machine interface to the communication system, is illustrated in block diagram form. This routine is entered in response to an interrupt signal generated by the PIA 112 to which the machine interface 111 is connected, the interrupt signal being generated when the request line 107 goes high.

The interrupt routine tests for a valid start pulse by delaying for a period and then retesting the state of the request line 107 to ensure that the start pulse is sufficiently long. If the start pulse is invalid, control returns to the poker machines main program.

If a valid start pulse has been received, the machine waits for the start of the next pulse on the request line 107 and then starts a timer and waits for the end of the pulse, at which time, the timer is read to determine the length of the pulse, a 'O' being represented by a lms pulse and a 'i' being represented by 2 ms pulse. The received bit is then written into the input buffer and the buffer tested to see if a complete character has been received. As each character is received, it is tested to determine whether it is the last (i.e. ETB) character of the transmission and if so, the command is decoded and tested to determine whether it was directed at that particular machine.

Once the machine has determined that the command was directed to it, the necessary tasks are performed and a reply message formulated and stored in an output buffer. The reply is then read from the output buffer, bit by bit, each bit being used to control the width of a successive pulse transmitted on the reply line (TX) 108. Once the output buffer is empty, control of the poker machine is again returned to the main program of the machine.

In the preferred embodiment of the present invention the central computer will send a machine serial number over the communication system, which is decoded by all poker machines in the system. The machine corresponding to the transmitted serial number will then transmit data back to the computer over the communication system.

The protocol devised consists of a Start Transmission Character (STX) followed by the machine serial number (XXXX), a command character (C) and data value (YYY), if required (as in remote credit transactions), and finally an End Transmission Block Character (ETB), to indicate the end of the transmission. In order to catch this data, the machine must be in the idle mode, hence if the machine is in play at this time it will not decode the message which must then be re-transmitted.

On detecting a STX from the central computer, the interface (I/F) will generate a Request Data Signal (RDS) on the Transmit line to wake up the machines, it will then pass on the data packet in the correct format until the End Transmission Block (ETB) is detected. The selected machine will then transmit the required data back to the interface unit which will format it into RS-232 and pass it on to the central computer system. The poker machine does not generate the STX character when it responds to a command from the central computer system, since the STX is used only to generate the RDS signal from the I/F unit to wake up the available machines when a command is first issued. However, the ETB is used at the end of the response to indicate the end of the transmission.

This list of command characters used in the system is as follows:

| "C" Command Listing | Description |
|---|---|
| A | Opto-Audit data is required (and cleared) |
| S | Opto-Audit data is required |
| I | Sending credit to machine. Actual value will follow this letter. |
| D | Collect any remaining credit on the machine. (same as COLLECT button but data is sent to the change booth) |
| Z | Machine lockup, needed until the player can get back to the machine. |
| R | Release the machine ready for playing. |
| J | Jackpot reset |
| Q | Cancel Credit reset |
| F | Flash mode to identify a machine |

A list of ASCII control characters used by the system is as follows:

| Character | Description | Keyboard | Hex Value |
|---|---|---|---|
| STX | Start of text | ΛB | 02 |
| ETB | End Transmission | ΛW | 17 |
| ACK | Acknowledge | ΛF | 06 |
| NAK | Negative Acknowledge | ΛU | 15 |
| CAN | Cancel | ΛX | 18 |

(Λ indicates use of "control key")

A description of each of the system commands will now be given, wherein the following symbols are used to indicate data fields in the command format and response:

| | |
|---|---|
| a | MACHINE SERIAL NUMBER |
| b | CANCEL CREDIT |
| c | COINS OUT |
| d | COINS IN |
| e | JACKPOTS |
| f | CASH BOX TOTAL |
| g | STROKES |
| h | DOOR OPENINGS |
| i | YO-YO's |
| j | REEL VIOLATIONS |
| k | EXISTING CREDIT |
| m | SHORT TIMEOUTS |
| n | LONG TIMEOUTS |

COMMAND: A
DESCRIPTION: Collect audit data and clear the audit meters.
FORMAT: STX XXX A ETB
RESPONSE:
XXX S * a b c d e f g h i j k l
m n ETB
NOTE: the "*" character will precede the audit data if the door is open. If the door is closed this character will not appear.

COMMAND: S
DESCRIPTION: Collect audit data but do not clear the audit meters.
FORMAT: STX XXX S ETB
RESPONSE: XXX * a b c d e f g h i j k l m
n ETB
NOTE: the "*" character will precede the audit data if the door is open. If the door is closed this character will not appear.

COMMAND: I
DESCRIPTION: Increment the credit meter by a specified value. This command must be issued twice so that the poker machine can match the value and verify the transaction accordingly. For the first command it will return an ACK to acknowledge receipt of the data packet. On the second transmission it will compare the two credit values "YYY" and, if a match occurs, will proceed with the transaction and issue a second ACK followed by the value "YYY". If there was no match it will respond with negative acknowledge (NAK) followed by the value it was trying to match.
NOTE: If credit was given to a poker machine when in the play mode it MUST be played off and cannot be collected by the player. Any wins
on the machine will be paid out immediately via the hopper. The coin block solenoid will not allow coins in during this period, however if a coin gets in it must be played off. The machine will stay in this mode until the credit is zero. If the credit is given to a machine in the service mode there is no change to the functional operation of the machine.
FORMAT(1): STX XXX I YYY ETB
RESPONSE: ACK ETB
FORMAT(2): STX XXX I YYY ETB
RESPONSE: ACK YYY ETB

COMMAND: D

-continued

DESCRIPTION: Decrement the value of the credit meter. This command will remove the players credit from the machine. With this command the central computer must know that the credit value is before it can issue the command, hence it must issue an audit status command "S" to determine the existing credit value. If the transaction was successful the poker machine will respond with a ACK followed by that value matched to the credit meter. If the value did not match it will respond with a NAK followed by the value it tried to match to (ie the existing credit). This command is used when the player wants to transfer his credit to another machine, or perhaps collect it in the form of chip credit at the change booth.

FORMAT: STX XXX D YYY ETB

RESPONSE: ACK YYY ETB

COMMAND: Z

DESCRIPTION: Lock the machine. This command is used to lock a machine to enable a player to get back to his machine after he has requested remote credit. That is the player must go to a remote terminal operator and specify the machine to play. The players credit is then given to the machine and if the player cannot .get to the machine the operator can lock it up. In this mode the machine will display "LLLL" on the credit meter.

FORMAT: STX XXX Z ETB

RESPONSE: ACK ETB

COMMAND: R

DESCRIPTION: Release a machine ready for play after being locked up. This command must be issued after the lock command to enable normal operation. When a machine is in the locked state it will respond with a negative acknowledge (NAK) to all other commands. Hence the "R" command is the only command recognized in the lock mode.

FORMAT: STX XXX R ETB

RESPONSE: ACK ETB

COMMAND: J

DESCRIPTION: Jackpot reset. Same effect as operation of the jackpot keyswitch when the machine is in the jackpot mode. The response to this command will only contain the J/P audit meter value if the machine is in the play mode, that is, a jackpot reset will be acknowledged but no value returned if the machine is in the service mode. The poker machine will respond with a NAK if it is not in the jackpot mode when this command is issued.

FORMAT: STX XXX J ETB

RESPONSE: ACK YYY ETB

COMMAND: Q

DESCRIPTION: Cancel credit reset. Same effect as the Jackpot Keyswitch during a cancel credit mode. The response to this command will only contain the cancel credit audit meter if the machine is in the play mode during the cancel credit. The poker machine will respond with a NAK if it is not in a cancel credit mode when this command is issued.

FORMAT: STX XXX Q ETB

RESPONSE: ACK YYY ETB

COMMAND: F

DESCRIPTION: Flash the light tower to identify the machine. There is an optional "B" character with this command to add sound to the flash mode. Also the value following the "F" will determine the flash period in seconds. When the machine is in this mode it cannot respond to any other commands.

FORMAT: STX XXX F YYY B ETB

RESPONSE: ACK ETB

If the MUX unit cannot understand information coming from a poker machine at any time, it will send CAN to the central computer system, preceded by an error number. Also, if the interface gets no response from the machines after sending data it will generate a CAN to the central computer system (preceded by a zero to indicate that the data was lost or ignored by busy machines).

The following is a list of error codes generated by the Interface Unit:

| Error Number | Description |
|---|---|
| 0 | No response from poker machines |
| 1 | Start bit error |
| 2 | Reserved |
| 3 | Stop bit error |
| 4 | Space between data pulses too long |
| 5 | Pulse too short (<600usec) |
| 6 | Pulse not well defined (1.4us < t <1.6us) |
| | 7 Pulse too long (>2.4msec) |
| | 8 Parity error 0 when expecting 1 |
| | 9 Parity error 1 when expecting 0 |

On power up the unit will transmit ++++^W^M to the central computer system. Also some diagnostic facilities are available with the MUX unit in the form of the following commands.

COMMANDS: SHORT, LONG

DESCRIPTION: These are used to vary the pulsed length of the RDS signal which is generated when the STX character is sent to the I/F. These can be varied from 5mSec to 1280mSec and are set to the defaults of 40mSec amd 250mSec on power up. They are used for test purposes only and should not be changed from their default values. The long pulse is used for the Jackpot Reset and Cancel Credit functions. All others used the short pulse length. After the command the I/F waits for a value which is interpreted as a 5mSec unit.

FORMAT(1): SHORT ^W (or LONG ^W)

FORMAT(2): YYY^W

RESPONSE: No response back to user but RDS pulse from now on is set to new value YYY.

COMMAND: ECHO

DESCRIPTION: This command is used to change the RS-232 line so that charaters will be echoed when being sent to the I/F. On power up the I/F default value is set to NOECHO.

FORMAT: ECHO ^W

RESPONSE: No response but all chars will be echoed from now on.

COMMAND: NOECHO

DESCRIPTION: This command is used to change the RS-232 line so that characters sent to the I/F from the central computer system will not be echoed back. On power up the I/F default value is set to NOECHO

FORMAT: NOECHO ^W

RESPONSE: No response but characters will not be echoed from now on.

COMMAND: DUMP

DESCRIPTION This command will dump the contents of the command buffer back to the central computer system. Notice that it does not require the terminating ETB (^W) character and that it is a one character command ("^" means Control char). Also a ^Z must be issued to stop the second buffer dump, since the dump begins at address $0000 (command buffer) and will continue through memory.

FORMAT: ^D

RESPONSE: Contents of the I/F command buffer in HEX format:

C000 17 52 4F 53 53 20 FF FF FF FF FF FF FF FF FF FF CR

C010 FF FF FF FF FF FF FF FF FF FF FF FF FF FF FF FF CR

C020 FF FF FF FF FF FF FF FF FF FF FF FF FF FF FF FF CR

C030 FF FF FF FF FF FF FF FF FF FF FF FF FF FF FF FF CR . . . and so on

COMMAND: DUMP 2

DESCEIPTION: This command will dump the contents of the response buffer back to the central computer system. The response buffer -continued

| | |
|---|---|
| | contains the characters received from the poker machines after a command has been issued. A^Z must be issued to stop the response buffer dump, since the dump begins at address $C200 (receive buffer) and will continue through memory. |
| FORMAT: | DUMP2 ^W |
| RESPONSE: | Contents of the I/F response buffer in HEX format:<br>C200 52 4F 53 53 20 17 FF FF FF FF FF FF FF<br>FF FF FF CR<br>C210 FF FF FF FF FF FF FF FF FF FF FF FF FF FF FF FF CR<br>C220 FF FF FF FF FF FF FF FF FF FF FF FF FF FF FF FF CR<br>C230 FF FF FF FF FF FF FF FF FF FF FF FF FF FF FF FF CR...and so on |
| COMMAND: | DUMP3 |
| DESCRIPTION: | This command will dump the contents of the scratchpad RAM and stack area back to the central computer system. The dump begins at $C700 and continues through memory until a ^Z is issued |
| FORMAT | DUMP3 ^W |
| RESPONSE: | Contents of memory in HEX format:<br>C700 52 4E 51 51 20 16 FF FF FF FF FF FF FF FF FF FF CR<br>C710 FF FF FF FF FF FF FF FF FF FF FF FF FF FF FF FF CR<br>C720 FF FF FF FF FF FF FF FF FF FF FF FF FF FF FF FF CR<br>C730 FF FF FF FF FF FF FF FF FF FF FF FF FF FF FF FF CR . . . and so on |
| COMMAND: | DIRECTORY |
| DESCRIPTION: | This command returns all the available commands for the I/F unit. To enable easy formatting each command is followed by a CR ($OD). Note that the single character commands are not listed in the directory (eg. ^Z, ^D) |
| FORMAT: | DIR ^W |
| RESPONSE: | ^M<br>LONG ^M<br>SHORT ^M<br>ECHO ^M<br>DUMP2 ^M<br>DUMP3 ^M<br>NOECHO ^M<br>DIR ^M<br>TEST ^M<br>^W |
| COMMAND: | RESET |
| DESCRIPTION: | This command is used to reset the I/F unit as in the power up sequence or hardware reset on the printed circuit board. Note that this is a one character command and does not require the ETB termination character. |
| FORMAT: | ^Z |
| RESPONSE: | +++ ^W^M |

It will be recognized by persons skilled in the art that numerous variations and modifications may be made to embodiments of the invention as hereinbefore described without departing from the spirit or scope of the invention as it is broadly described.

I claim:

1. An apparatus for distributing information to gaming machines for individual game machine control of machine operation depending upon credit available, comprising in combination:

a plurality of gaming machines adapted for independent operation with respect to one another;

central means for recording and storing credit information;

a communication means for individual ones of said plurality of gaming machines and transmitting conformation between said central means for storing and recording credit information;

individual ones of said plurality of gaming machines each having a local means for recording and storing credit information;

each said local means being capable of storing a plurality of credit balances, and of establishing credit, cancelling credit, and transferring credit information to a selected one of said individual ones of said plurality of gaming machines according to instructions from said central means;

individual ones of said plurality of gaming machines each having a control means for enabling operation of the respective gaming machine;

each said control means having a means for interrogating said local means, said control means selectively enabling operation of said respective gaming machine in response to information received regarding credit;

said respective control means enabling operation of said respective gaming machine when a particular credit balance is at least equal to a predetermined amount;

said individual ones of said plurality of gaming machines each having respective transmitter means and receiver means for communicating with said communication means;

each said respective local means being interrogable and adjustable in response to commands from said central means;

said individual ones of said plurality of gaming machines each having respective game cycles; each of said individual ones of said plurality of gaming machines being capable of enabling at least a plurality of gaming cycles without communicating with said central means depending upon the particular credit balance recorded by said respective local means;

whereby each of said individual ones of said plurality of gaming machines are operable through a plurality of gaming cycles without interrogating said central means for each gaming cycle;

said local means debiting the particular credit balance for each gaming cycle, the amount of debit being a wager;

said local means being capable of transmitting particular credit balances to said central means when interrogated by said central means.

2. The system as claimed in claim 1 wherein a multiplexing unit is located between the central means and the plurality of gaming machines.

3. The system of claim 2 wherein the gaming machines connected to the multiplexing unit are each connected thereto via to a common three wire bus.

* * * * *